United States Patent [19]
Takagi et al.

[11] Patent Number: 5,325,893
[45] Date of Patent: Jul. 5, 1994

[54] AIR DUCT AND PAPER THEREFOR

[75] Inventors: Akinobu Takagi, Numazu; Isao Ohtake, Shizuoka; Osamu Nakano, Shizuoka; Toru Murakami, Shizuoka, all of Japan

[73] Assignee: Tokushu Paper Mfg. Co., Ltd., Shizuoka, Japan

[21] Appl. No.: 955,053

[22] Filed: Oct. 1, 1992

[30] Foreign Application Priority Data

Oct. 4, 1991 [JP] Japan .............................. 3-080938[U]
Jan. 9, 1992 [JP] Japan .................. 4-002373

[51] Int. Cl.$^5$ .............................................. F16L 9/04
[52] U.S. Cl. .............................. 138/143; 138/DIG. 4; 138/DIG. 1; 138/173
[58] Field of Search ............... 138/143, 141, 144, 163, 138/DIG. 4, 145, 146, DIG. 1, 121, 154, 135, 136, 122, 172, 173; 229/93

[56] References Cited

U.S. PATENT DOCUMENTS

| | | | |
|---|---|---|---|
| 2,089,492 | 8/1937 | Lambert | 138/DIG. 4 |
| 2,108,159 | 2/1938 | Barman | 138/DIG. 4 |
| 2,132,642 | 10/1938 | Parsons | 138/DIG. 4 |
| 2,160,009 | 5/1937 | Walker | 138/DIG. 4 |
| 2,430,275 | 11/1947 | Callan | 138/143 |
| 3,654,966 | 4/1972 | Waksman | 138/141 |
| 3,768,523 | 10/1973 | Schroeder | 138/141 |

FOREIGN PATENT DOCUMENTS

| | | |
|---|---|---|
| 45-8164 | 3/1970 | Japan . |
| 49-122018 | 11/1974 | Japan . |
| 52-25354 | 2/1977 | Japan . |
| 53-166748 | 12/1978 | Japan . |
| 54-11321 | 1/1979 | Japan . |
| 55-6587 | 1/1980 | Japan . |
| 55-57419 | 4/1980 | Japan . |
| 55-61426 | 5/1980 | Japan . |
| 56-60895 | 5/1981 | Japan . |
| 57-16676 | 1/1982 | Japan . |
| 57-167252 | 10/1982 | Japan . |
| 57-171799 | 10/1982 | Japan . |
| 58-101079 | 7/1983 | Japan . |
| 58-102883 | 7/1983 | Japan . |
| 59-68204 | 4/1984 | Japan . |
| 59-99186 | 6/1984 | Japan . |
| 59-177897 | 11/1984 | Japan . |
| 1-73597 | 5/1989 | Japan . |
| 1-261588 | 10/1989 | Japan . |
| 2-46187 | 3/1990 | Japan . |
| 2-243337 | 9/1990 | Japan . |
| 3-31251 | 3/1991 | Japan . |
| 3-17105 | 4/1991 | Japan . |
| 3-161598 | 7/1991 | Japan . |

*Primary Examiner*—Timothy F. Simone
*Assistant Examiner*—Patrick F. Brinson
*Attorney, Agent, or Firm*—Oblon, Spivak, McClelland, Maier & Neustadt

[57] ABSTRACT

An air duct is disclosed which includes a tubular member formed from a metal sheet. A paper is disposed around an outer periphery of the tubular member for preventing condensation droplets condensed on the tubular member from dripping, and an adhesive is interposed between the tubular member and the paper to adhesively secure the tubular member and the paper. Furthermore, a paper for an air duct, adapted to be secured to an outer periphery of the air duct, is disclosed. The paper is produced from a material including a papermaking pulp and is characterized by the following: a wet strength of at least 0.3 kgf/15 mm, a critical value for dripping of water droplets of at least 45 g/m$^2$, and a basis weight of 40 to 5000 g/m$^2$.

6 Claims, 6 Drawing Sheets

AIR DUCT AND PAPER THEREFOR

BACKGROUND ART

The present invention relates to an air duct for use in air conditioning facilities in buildings and to a paper for use in the air duct, and in particular an air duct in which condensation thereon is prevented from dripping as well as to a paper to be wound around a tubular member to insulate the air duct.

Air ducts composed of a tubular member of a square, oblong, or circular cross-section made of a tin or aluminum sections are indispensable as conduits materials for air conditioning facilities in buildings. Among various ducts of these kinds, a rectangular duct, a round duct, a spiral duct, and a flexible spiral duct are well-known.

Figure 1:
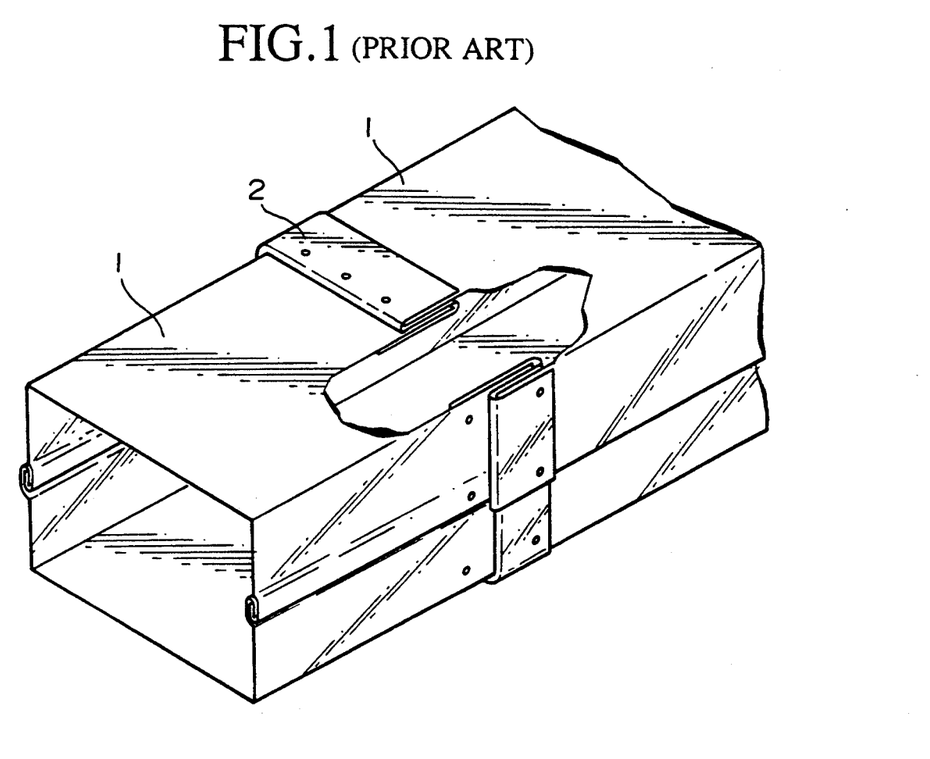
FIG. 1 is a partially cut-away perspective view of a conventional rectangular duct.

As illustrated in FIG. 1, the rectangular duct is constructed by shaping metal sheets into tubular members 1 of a square or oblong cross-section and connecting the tubular members 1 together in a longitudinal direction by means of S-shaped seams 2. The round duct is formed by curving metal sheets into tubular members of a circular cross-section and connecting the tubular members in a longitudinal direction by means of grooved seams. The spiral duct is constructed by winding metal sheets spirally into tubular members of a circular cross-section and connecting the ends of the metal sheets by means of grooved seams.

Figure 2:
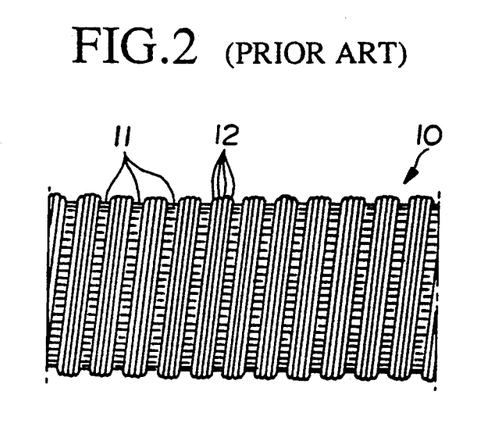
FIG. 2 is a side elevational view of a conventional spiral duct showing a contracted state thereof.
Figure 3:
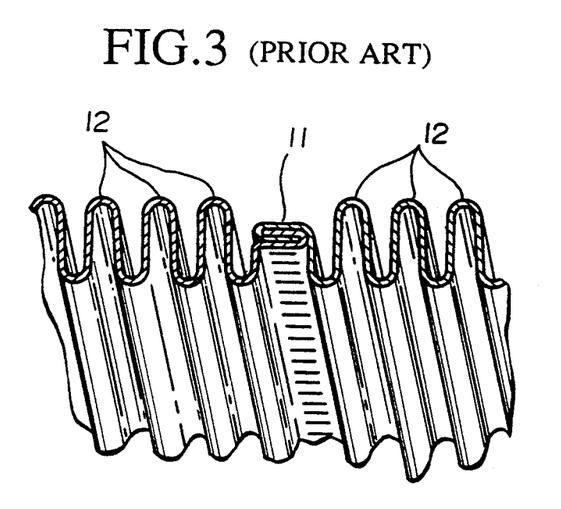
FIG. 3 is an enlarged cross-sectional view of a seam portion of the conventional duct of FIG. 2.

Furthermore, the flexible spiral duct is formed by winding metal sheets of uniform width spirally into a tubular member, and as shown in FIGS. 2 and 3, corrugated ribs are formed on the surface thereof mainly in order to enhance the strength and workability of the tubular member. The flexible spiral duct of FIGS. 2 and 3 is disclosed in Japanese Utility Model Application, B-Publication (Koukoku) No. 3-17105, and comprises a tubular member 10 formed by winding a metal sheet of a prescribed width spirally while seaming the lateral ends thereof. Several corrugated ribs 12 are formed between the adjacent two seams 11 and 11 of the tubular member, whereby the flexible spiral duct is expansible and contractible in an axial direction thereof. During the construction of an air duct facility, the flexible duct in a contracted state is simply expanded to a desired length, bent as necessary, and secured. Thus, the use of the flexible duct enables bent arrangements for the piping and allows easier piping installation. For manufacturing the flexible spiral duct as described above, as shown, for example, in FIG. 4, a metal sheet 13 is fed into a shaping machine 14 to form the corrugated ribs 12 along the moving direction, and is then wound spirally on a roll 15 arranged obliquely with respect to the above moving direction. Subsequently, the lateral ends of the metal sheet are seamed to provide a continuous tubular member 10.

When the air ducts as described above are used in pipings for air conditioning facilities in buildings such as pipes for cooling or intake pipes for ventilation, cooled air is caused to flow through the air ducts, and water vapor contained in the ambient air is condensed on the outer peripheral surface of the ducts due to the temperature difference between the inside and outside of the duct.

This condensation may cause the air duct to corrode, thereby reducing the service life thereof. Furthermore, the condensation droplets may stain the ceiling, the walls, the floor and so on, or may otherwise reduce the service life of the buildings. The condensation on electrical wiring may cause short circuiting.

Conventionally, for the prevention of the condensation, heat insulating material such as rock wool, glass fiber, urethane foam resin, nonwoven fabric, or the like is wound on the outer periphery of the air duct, and is fixedly secured thereto by covering the entire duct with a tape or a metal sheet.

However, the above conventional method of using heat insulating materials requires laborious work inside the insulating material must be wound at the construction site after the air duct is installed. Therefore, increased expenses cannot be avoided. In addition, the work space is often very small and even dangerous in some cases. In particular, in the case where a flexible spiral duct is employed as the air duct, the advantages of using this type of duct will be lost.

Moreover, even though heat insulating materials are employed, it is very difficult to completely prevent condensation. Therefore, when cooled air is allowed to run through the duct, condensation, even if slight, inevitably condenses on the outer periphery of the duct and is absorbed into the insulating material. However, heat insulating material generally is poor in releasing water, and its outer periphery must be almost entirely covered with a tape or a metal sheet. Consequently, even after the supply of cooled air into the duct ceases, the water absorbed into the heat insulating material remains therein and does not evaporate. This causes the duct to corrode. Furthermore, since the condensation which penetrated into the heat insulating material gradually accumulates therein, the heat insulating efficiency is thereby lowered. The droplets from the heat insulating material may further stain the ceiling, the walls, the floor and so on, or may otherwise reduce the service life of the buildings. Condensation on the electrical wiring may cause short circuiting.

Moreover, when the heat insulating material is wound around the aforesaid flexible spiral duct, gaps inevitably form between the heat insulating material and the corrugated ribs formed on the tubular member, and water absorbed into the heat insulating material may remain in the gaps and thereby accelerate the corrosion of the duct.

Furthermore, since the heat insulating material contains a high proportion of resin constituents, it burns easily, and additionally, during a fire, toxic gases are produced.

SUMMARY OF THE INVENTION

It is therefore a primary object of the present invention to provide an air duct which can effectively prevent condensation from dripping and thereby solve the aforementioned problems.

Another object of the invention is to provide a paper which can be wound around a tubular member to impart to a resulting air duct an ability to prevent droplets of condensation from dripping.

According to a first aspect of the present invention, there is provided an air duct comprising:
  a tubular member formed from a metal sheet;
  a paper disposed around an outer periphery of the tubular member for preventing droplets condensed on the tubular member from dripping; and
  adhesive interposed between the tubular member and the paper to adhesively secure the tubular member and the paper.

According to a second aspect of the invention, there is provided a paper for an air duct, adapted to be secured to an outer periphery of the air duct, the paper being produced from a material including a papermaking pulp, the paper being characterized by the following:

a wet strength of at least 0.3 kgf/15 mm,
a critical value for dripping of water droplets of at least 45 g/m$^2$, and
a basis weight of 40 to 5000 g/m$^2$.

The paper used for preventing droplets from dripping and the adhesive used for adhesively securing the paper to the tubular member have thermal conductivities lower than that of the metal from which the tubular member is formed, and the paper material has a structure in which minuscule air spaces are contained therein. Therefore, the above materials exhibit a heat insulating effect and thermally insulate the tubular member from the ambient air to thereby prevent condensation.

Furthermore, the paper of the invention can be stuck to the outer periphery of the tubular member during the manufacture of the tubular member of the air duct, and hence the task of wrapping heat insulating materials and the task of covering the metal plates are no longer required.

In particular, an expandable and contractible spiral duct which includes the anti-drip condensation-inhibiting paper held in close contact with the corrugated ribs can be simply manufactured by adhesively securing the anti-drip condensation-inhibiting paper to a planar metal sheet, forming the corrugated ribs, and forming seamings the lateral ends thereof. Work required during installation is merely to expand and fixedly secure the duct. Therefore, the above duct ensures superior heat insulating efficiency without losing the excellent handling efficiency and workability of installation that the spiral duct affords. Furthermore, since the anti-drip condensation-inhibiting paper is adhesively secured by means of adhesive, the paper is prevented from separating from the corrugated ribs, and the formation of gaps is avoided.

Moreover, the paper material has a good ability to release water. Therefore, even when condensation is not completely prevented and condensation is absorbed into the anti-drip condensation-inhibiting paper, the water absorbed dissipates in the ambient air when the flow of the cooled air in the duct ceases. For this reason, the duct is prevented from being subjected to oxidation due to absorbed water, and a prescribed heat insulating effect is maintained. Furthermore, the formation of water droplets as well as the penetration thereof into nearby concrete structures can be avoided.

Furthermore, in the case where the anti-drip condensation-inhibiting paper is composed of a flameproof paper, the duct is not susceptible to burning in case of fire, and even if it should burn, no toxic gases are produced.

DETAILED DESCRIPTION OF THE INVENTION

After having observed the phenomenon of condensation in detail and having made an extensive study thereon from a new point of view, the inventors have found that the wrapping of a special paper around an air duct is particularly effective in preventing problems of condensation. More specifically, the inventors have recognized that the problems are mainly incurred by the condensation when droplets fall on ceiling material or the like. In other words, the problems do not occur if the condensation droplets do not fall. Therefore, the inventors have attempted to use various water absorbing materials in order to find an effective way to absorb the condensation water.

As a result of the study, the inventors have found that if the condensation water does not drip within three hours after the start of the operation of the air conditioning, no water will fall thereafter. This is conjectured to be because the ambient air around the air duct reaches a moisture content and temperature at which no condensation occurs within three hours after the start of the operation of the air conditioner.

Furthermore, the inventors believe that a paper material produced by a papermaking pulp might be the most suitable for the above purpose since it has easy workability, excellent productivity, low price and the like, and have examined various paper materials as to water absorbancy.

An air duct in accordance with an embodiment of the invention will be explained with reference to FIGS. 5 to 8.

Figure 6:
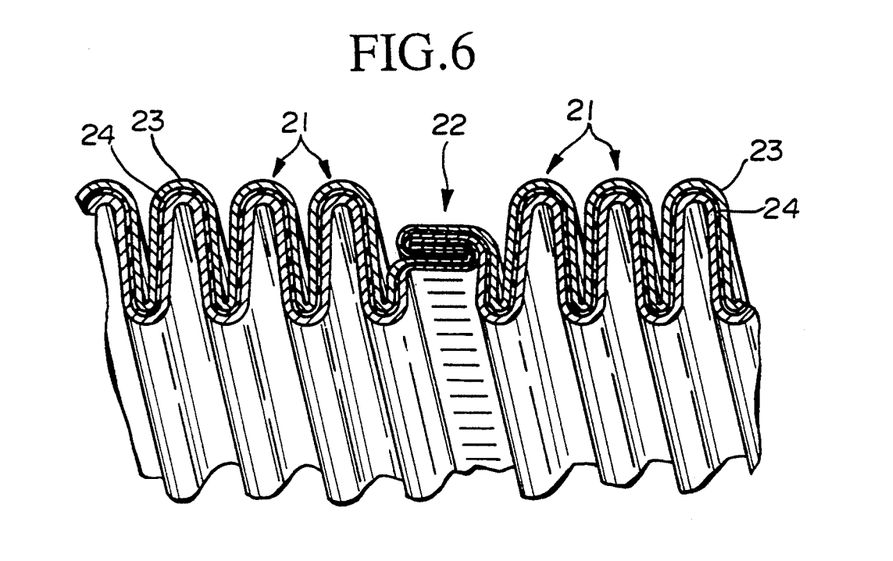
FIG. 6 is an enlarged cross-sectional view of a seam portion of the duct of FIG. 5 in a contracted state.
Figure 7:
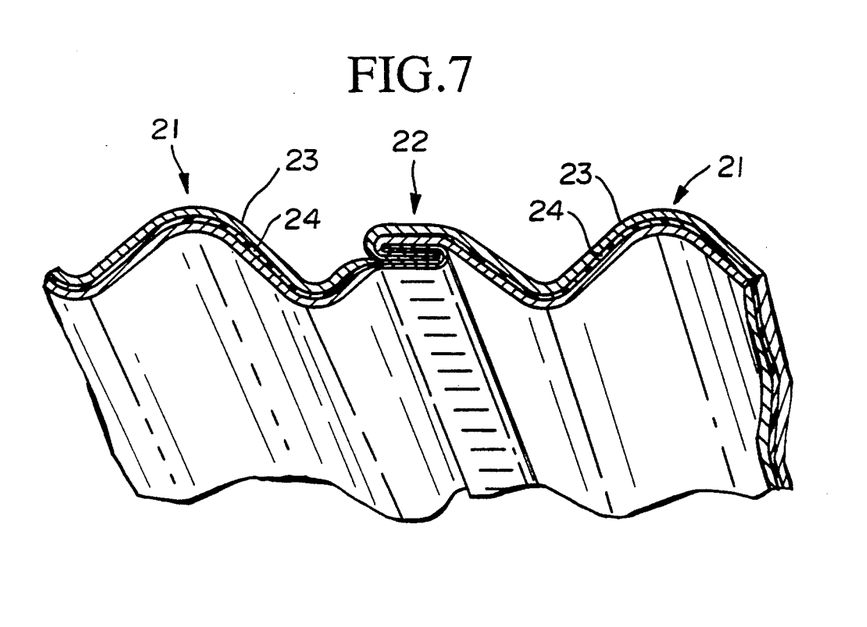
FIG. 7 is a view similar to FIG. 6, but showing an expanded state of the duct.

As illustrated, the air duct in accordance with the present embodiment includes a tubular member 20 which is constructed by winding a metal sheet of a prescribed width spirally while seaming the lateral ends thereof, and which has several corrugated ribs 21 formed between two adjacent seams 22 thereof. Furthermore, as shown in FIGS. 6 and 7, the air duct includes an anti-drip condensation-inhibiting paper 23, which is wrapped around the outer peripheral surface of the tubular member 20 so as to entirely cover the surface of the tubular member 20, even including the corrugated ribs 21, and is adhesively secured thereto by an adhesive layer 24 interposed therebetween, whereby no gaps are formed between the tubular member and the anti-drip condensation-inhibiting paper. In the illustration of FIGS. 6 and 7, the thicknesses of the anti-drip condensation-inhibiting paper 23 and the adhesive layer 24 are relatively enlarged.

The anti-drip condensation-inhibiting paper 23 secured to the tubular member 20, i.e., a paper for an air duct of the invention will now be explained in detail.

As described above, the inventors have investigated the various paper materials as to water absorbancy, and during the investigation, they have found that the ability to prevent condensation droplets from dripping can be effectively evaluated by using a "critical value for dripping of water droplets" as a new measure. This critical value is calculated based on the following procedures: a bone dry test piece of paper having a weight Wa ($g/m^2$) is first immersed in water and extracted after 4 hours. Then, the test piece is hung vertically to allow excess water to completely drip out. Thereafter, the test piece is weighed to obtain a weight Wb ($g/m^2$), to thereby calculate the saturation amount of absorbed water per unit area of bone dry paper, which defines the above critical value. Namely, the critical value for the dripping of water droplets is defined by the following formula: $[Wb - Wa]$ ($g/m^2$).

In the case where the above critical value of a paper is not less than 45 $g/m^2$, even though condensation forms on the outer peripheral surface of the tubular member of the air duct, the paper absorbs the condensing water by capillary action and retains the water therein without allowing it to fall for at least approximately 3 hours after the start of the air conditioning. Thus, in the paper for an air duct of the present invention, the critical value at which water droplets will drip should be at least 45 $g/m^2$.

Furthermore, if the paper does not have sufficient wet strength, the paper that has absorbed water cannot keep its shape, resulting in separation from the annular member of the air duct. After the investigation, the inventors have found that it is therefore necessary for the paper to have a wet strength of at least 0.3 kgf/15 mm when measured according to a measuring method of wet strength specified as Japanese Industrial Standard P 8130. As will be described later, the wet strength can be increased by adding a wet strength increasing agent to the paper stock the during the paper making.

Furthermore, the paper for an air duct of the invention should have a sufficient strength so as not to be broken and deformed during the installation of air ducts. Therefore, the basis weight of the paper should be at least 40 $g/m^2$. In this connection, the greater the basis weight, the greater the heat insulating property and the critical value for dripping of water droplets. However, if the basis weight is not less than 40 $g/m^2$, the paper exhibits sufficient heat insulating effects, and comes to possess the above critical value of no less than 45 $g/m^2$. On the other hand, if the basis weight is unduly great, it becomes difficult to manufacture the paper, resulting in increased costs, and additionally, the workability deteriorates simply because of the increase in weight. Therefore, the upper limit for the basis weight is determined to be approximately 5000 $g/m^2$.

The paper of the present invention may be secured to the metal sheet in advance before the metal sheet is formed into a tubular shape. In this case, it is necessary for the paper itself to have a good formability. Therefore, it is preferable that the basis weight of the paper be no greater than 500 $g/m^2$. If the basis weight exceeds 500 $g/m^2$, the curvature of ribs becomes unduly small due to the paper thickness during the formation of corrugated forms, so that precisely defined shaping cannot be attained, and additionally the resulting duct might be unduly hard with great compressive resistance.

Furthermore, the paper for an air duct is required to have property of dissipating the absorbed water during and after the operation of the air conditioner. However, a paper material, in general, can quickly dissipate the absorbed water from its outer periphery.

For manufacturing the aforesaid paper of the invention, a papermaking pulp and a wet strength increasing agent are essential.

A wood pulp such as a softwood unbleached kraft pulp, a softwood bleached kraft pulp, a hardwood bleached kraft pulp, a softwood bleached sulfite pulp and the like is mainly employed, and a hemp pulp, a cotton pulp, a straw pulp, a bast fiber, a synthetic fiber, a binder of PVA fibers, and furthermore glass fiber, rock wool, silica alumina silicate fiber, alumina fiber, zirconia fiber, calcium titaniate fiber or the like may be added as necessary.

Employed as the wet strength increasing agent in the invention is a known agent such as a melamine resin, a urea resin, a polyamide-epichlorohydrine resin, resins of polyacrylamides or the like. This agent is added in an amount required to obtain a wet strength of no less than 0.3 kgf/15 mm. Usually, the agent is added in an amount of 0.05% to 2.0% by weight, preferably 0.5% to 1.0% by weight with respect to bone dry weight of the pulp.

During paper making, the wet strength increasing agent, a fixing agent, and as necessary, a dry strength increasing agent, a sizing agent, or a coloring agent is added. The paper is manufactured by a conventional cylinder paper machine, a Fourdrinier paper machine or the like at a freeness of 300 to 620 ml C.S.F.

The paper thus manufactured possesses the required characteristics such as the critical value for water dripping, the water resistance property, the physical strength, the formability, the releasability of condensed water, the heat insulating property or the like. However, in order to further improve the heat insulating property, the critical value for water dripping, the releasability of condensation water, the formability or the like, it is more preferable that an inorganic powder be added to the papermaking pulp or that at least one of the faces of the base paper be coated with a coating color or mixture consisting essentially of an inorganic powder and a binder. Furthermore, the flameproof property, the moisture absorbing and desorbing property, and the ability to prevent propagation of fungus and bacteria can also be improved by suitably selecting the inorganic powder.

Kaolin, clays, calcium carbonate, titanium dioxide, talc and the like, which are extensively used in the paper manufacturing industry, may be used as the above inorganic powders. In addition, other inorganic powders having a self-extinguishing property, the moisture absorbing and desorbing property, or an antibacterial property could as well be employed alone or in combination.

As the inorganic powder with self-extinguishing properties, aluminum hydroxide, magnesium hydroxide, calcium aluminate, calcium hydroxide, zinc borate, calcium borate, barium metabolate, borax, and boric acid may be used. When heated, these powders dissipate a great amount of water due to an endothermic reaction and thereby inhibit combustion.

In order to impart the flameproof properties to the above paper, it is necessary to use a great amount of the self-extinguishing powder. For example, when using aluminum hydroxide alone, it is necessary to add it in an amount of no less than 80% by weight with respect to cellulose fiber.

The inorganic powder with the moisture absorbing and desorbing property includes one type in which the powder itself absorbs or desorbs the moisture and the other type in which the powder does not absorb the moisture but adsorbs water by capillarity due to its great specific surface area. The former type includes silica gel, silica alumina gel, alumina gel, synthetic zeolite, natural zeolite, synthetic silica, acid clay, activated clay, alpha-sepiolite, beta-sepiolite, palygorskite (attapulgite) allophane, imogolite or the like, while the latter type includes vermiculite, calcium silicate or the like.

Selected as an antibacterial inorganic powder is a powder of a modified zeolite which contains antibacterial ions such as silver ions and copper ions captured in its skeleton structure, a powder of a modified activated carbon fiber which contains silver ions therein, or the like.

When the inorganic powder is mixed with the papermaking pulp before the papermaking process, the inorganic powder is usually added in an amount of 85% to 10% by weight with respect to 15 to 90% by weight of pulp. If the amount of the inorganic powder exceeds 90% by weight, the physical strength required as a paper for an air duct becomes insufficient.

The inorganic powder may be used by means of a coating method in which a coating color containing the inorganic powder and a binder is applied to a base paper. Upon the preparation of the coating color, one or more kinds of the inorganic powders as described above are mixed, and a dispersing agent is added thereto. Furthermore, as the binder, a synthetic rubber latex such as a styrene-butadiene rubber (SBR) or a methyl metaacrylate-butadiene rubber (MBR), acrylic emulsion, vinyl chloride emulsion, vinylidene chloride emulsion, and their copolymer emulsions, casein, starch, polyvinyl alcohol, and the like are added in combination as necessary. Furthermore, auxiliary materials such as a water retaining agent, a leveling agent, a mildewproofing agent, an antiseptic agent, a coloring agent, or the like are added as necessary. It is preferable that vinyl chloride emulsion, vinylidene chloride emulsion, or their copolymer emulsion be mainly used as the binder since these have lower calorific values and exhibit flame retardancy.

As the mildewproofing agent, known compounding agents such as benzimidazole compounds or nitrogen-containing sulfur compounds may be used, and this agent is usually added in an amount of 0.1 to 1.2% by weight with respect to the coating color. When the aforesaid antibacterial agent is used, the amount of the mildewproofing agent used may be reduced.

It is preferable that the binder be added in an amount of 5 to 30% by weight with respect to the inorganic powder. If the binder content is less than 5% by weight, the resulting coating layer has insufficient strength. On the other hand, if the binder content exceeds 30% by weight, the flameproof property is deteriorated.

The coating color thus prepared may be coated on one or both faces of the base paper by a coater such as an air knife coater, a blade coater, a roll coater or the like.

As described above, when imparting the flameproof property to the base paper using only the self-extinguishing inorganic powder, a great amount of the inorganic powder must be employed, so that problems such as reduction in paper strength may occur. To avoid this problem, the base paper, which contains less inorganic powder, may be prepared first, and the flameproof agent is then impregnated in the paper using a sizing press on the papermaking machine, a Billblade coater, a gate roll coater, or the like. The flameproof agent to be impregnated may be guanidine sulfaminate, guanidine phosphate, ammonium sulfaminate, condensed alkyl phosphate ester derivatives, guanidine sulfate, ammonium phosphate, ammonium sulfate, or the like, which can be used as an aqueous solution or can be dispersed in water. Additionally, other materials for paper manufacture such as starch, a sizing agent, dye, or the like, or a heat-resisting auxiliary agent such as dicyandiamide, methylol of melamine or methylol of dicyandiamide may also be used. These agents are impregnated in the base paper in an amount of 5% to 35% by weight.

Furthermore, the front or rear face, or both faces of the base paper in which the flameproof agent or the like is impregnated, may be further coated with a coating color composed of the inorganic powder and the binder. This coating may be carried out as an off-machine operation after the manufacture of the base paper.

Moreover, it is preferable that the duct paper of the invention be provided with flame retardancy corresponding to a first grade of flame retardancy defined in "Flame Retardancy Testing Methods for Interior Finish Materials and Construction Methods of Buildings" of Japanese Industrial Standard A 1321. In order for a paper to exhibit the first grade flame retardancy, it is necessary that combustible be contained in 10 to 50% by weight per bone dry weight of the paper. Accordingly, in a paper of a basis weight of 40 to 5000 g/m$^2$, a combustible fraction of (4–20) to (500–2500) g/m$^2$ is contained.

The above combustible may mainly include cellulose fiber (pulp), wet or dry strength increasing agents, sizing agents, and organic compounds such as latex. If the combustible content exceeds 50% by weight, a temperature increase exceeding 810° C. is observed in the base material test of Japanese Industrial Standard A 1321, and the fuming coefficient and the exhaust gas temperature exceed the reference value in the surface test, so that the paper falls short of the standard. On the other hand, if the combustible content is less than 10% by weight, the paper strength is lowered, and the minimum critical value of condensation falling of 45 g/m$^2$ cannot be attained. Furthermore, it is preferable that the combustible be from 15 to 35% by weight, and the flame retardant paper having a coating layer on one or both faces to increase the flame retardancy.

For securing the above paper to the metal sheet before shaping the metal sheet into the tubular member, the following methods 1) to 5) may be adopted.

1) Wet lamination method: In this method, after a water or solvent type paste such as starch paste or vinyl acetate emulsion is coated, the paper is laminated and the paste is dried.
2) Dry lamination method: An adhesive of polyurethanes or the like is coated, and the solvent is evaporated. Thereafter, the paper and the metal sheet are caused to pass through heat rolls to form the laminated body.
3) Extrusion lamination method: A molten resin of polyethylene, polypropylene or the like is extruded into the space between the metal sheet and the paper to secure them together.

4) Hot melt-lamination method: The paper is secured to the metal sheet by coating a molten resin such as ethylene-vinyl acetate copolymer resin.

5) Lamination method using adhesion film: An ionomer resin, etylene-vinyl acetate copolymer resin, or the like is inserted through the metal sheet and the duct paper, and they are pressed by heated rolls.

Among the above lamination methods, it is preferable that the methods 3) and 5) be employed since the adhesive layer formed in the metal sheet and the paper serves as a film barrier to prevent the condensation water absorbed in the paper from contacting the metal sheet, so that the corrosion of the metal sheet can be effectively prevented. In particular, the extrusion-lamination method using polyethylene is suitable due to easy workability, low cost of resin, and low quantity of heat in combustion. In this method, it is usually preferable that the thickness of the polyethylene layer be 5 to 30 micrometers.

Figure 4:
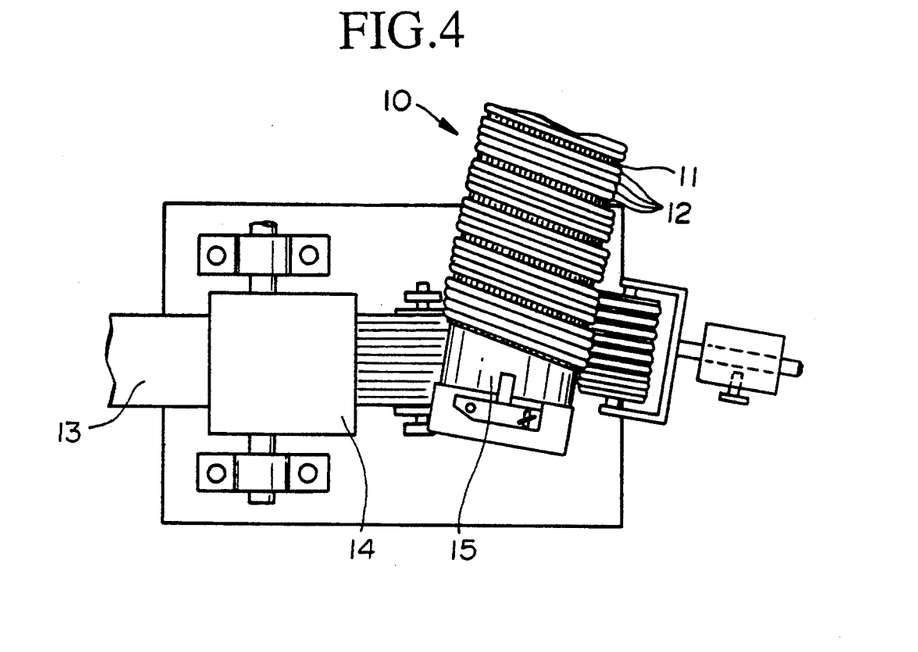
FIG. 4 is a plan view of an apparatus for manufacturing the spiral duct of FIG. 2.

The spiral air duct of the above embodiment can be easily manufactured by laminating the anti-drip condensation-inhibiting paper on the planar metal sheet of a prescribed width in advance, forming corrugated ribs thereon by means of the apparatus of FIG. 4, and seaming the lateral ends thereof while spirally winding the metal sheet so that the paper is disposed on the outside.

Figure 8:
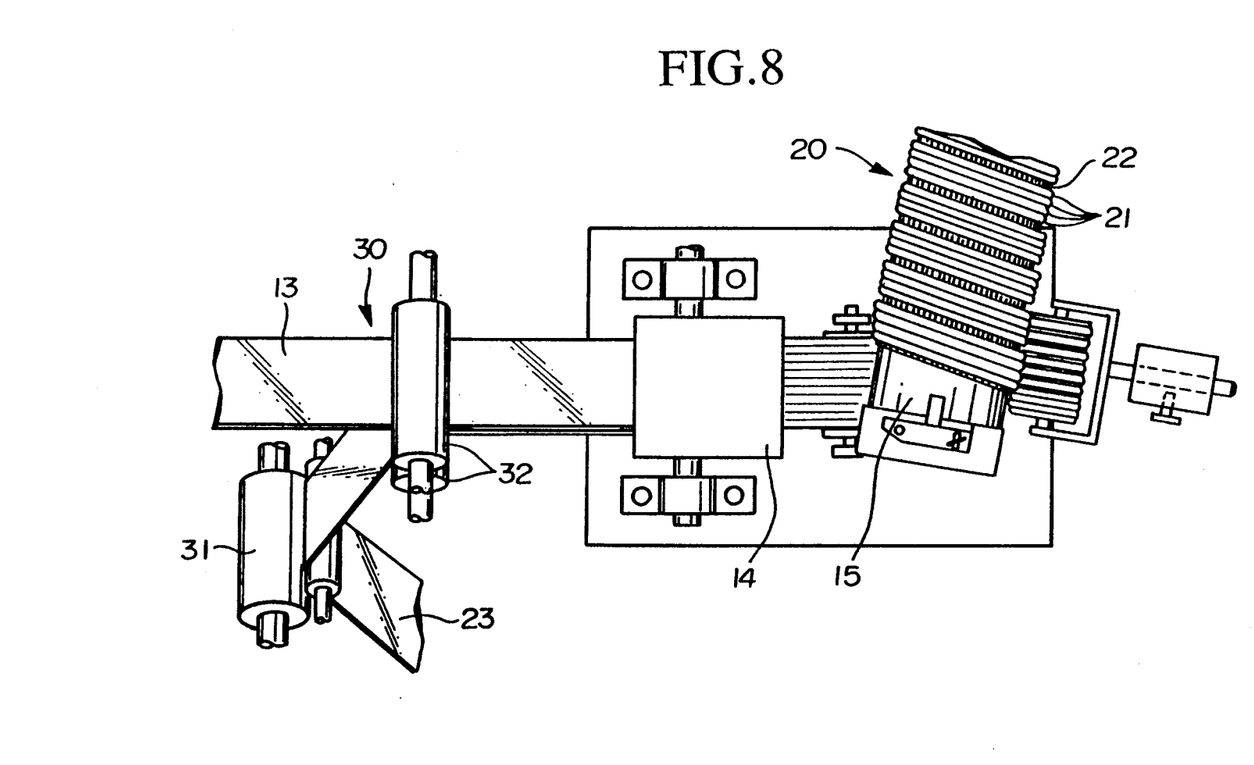
FIG. 8 is a plan view of an apparatus for manufacturing the spiral duct of FIG. 5.

Furthermore, as shown in FIG. 8, an apparatus 30 for laminating the anti-drip condensation-inhibiting paper to the metal sheet may be provided in front of the apparatus of FIG. 4. In this modified apparatus, the lamination of the anti-drip condensation-inhibiting paper to the metal sheet, the formation of the corrugated ribs, and the seaming of the metal sheet can be carried out in a single continuous step. In FIG. 8, the parts in common with those of the apparatus of FIG. 4 are designated by identical numbers. Furthermore, in the coating apparatus, 31 and 32 denote a coating roll for coating adhesive on the anti-drip condensation-inhibiting paper 23 in a constant thickness, a laminating roll for adhesively securing the anti-drip condensation-inhibiting paper 23 to the metal sheet 13, respectively.

Figure 5:
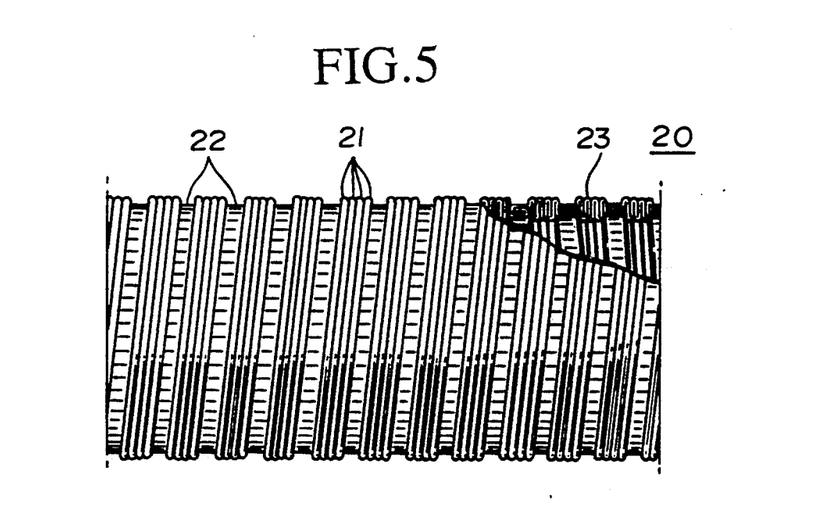
FIG. 5 is a partially cut-away side elevational view of an air duct in accordance with a first embodiment of the invention.

The spiral duct thus manufactured is contracted as shown in FIGS. 5 and 6 so that the corrugated ribs 21 are closer to one another, and is conveyed to the construction site. In this connection, since the spiral duct is contracted compared to the length required for piping, it is easy to handle the duct. In addition, since the delivery space is saved, a greater number of ducts can be delivered in one delivery, thereby enhancing transport efficiency. Furthermore, since the corrugated ribs are close to one another, the strength of the tubular member is enhanced, and hence damage due to impact caused during transport can be prevented.

Moreover, in the air duct of the above construction, the anti-drip condensation-inhibiting paper 23 secured to the outer periphery of the tubular member and the adhesive used for adhesively securing them have thermal conductivities lower than that of the metal from which the tubular member is formed, and the paper material is of a structure containing minuscule air spaces therein. Therefore, the above materials exhibit a heat insulating effect of thermally insulating the tubular member from the ambient air to thereby prevent condensation.

Furthermore, the paper of the invention can be stuck to the outer periphery of the tubular member during the manufacture of the tubular member of the air duct, and hence the wrapping work of heat insulating materials as well as the covering work for the metal plates are no longer required. As a result, time and labor required for the above work can be saved, and working efficiency can be improved substantially.

In particular, the spiral duct, which includes the anti-drip condensation-inhibiting paper 23 held in close contact with the corrugated ribs 21, can be easily used by simply expanding the duct to a desired length during the construction and securely fixing it. Therefore, the above duct ensures superior heat insulating efficiency without losing the excellent handling efficiency and workability of construction that the spiral duct possesses.

Furthermore, since the anti-drip condensation-inhibiting paper 23 is adhesively secured by means of adhesive 24 before the corrugated ribs are formed, the formation of gaps between the paper and the corrugated ribs is prevented. Therefore, the deterioration of the heat insulation due to gaps can be avoided. Additionally, the metal is not exposed to air even at the seaming portion, so that heat insulating efficiency is not lost.

Moreover, the paper material exhibits a high ability to release water. Therefore, even when the condensation is not sufficiently prevented so that condensing water is absorbed into the anti-drip condensation-inhibiting paper 23, the water adsorbed is dissipated in the ambient air when the flow of the cooled air in the duct ceases. For this reason, the duct is prevented from being subjected to oxidation due to the condensation water, and the deterioration of the service life of the duct can be avoided in advance. Furthermore, the formation of water droplets as well as the penetration thereof into the surrounding concrete structure to reduce the life of the buildings can be avoided, and the reduction of the heat insulating effect of the anti-drip condensation-inhibiting paper due to the water retention can be prevented.

Furthermore, in the case where the anti-drip condensation-inhibiting paper 23 is composed of a flameproof paper, the paper is insoluble in water, and hence it is prevented from being dissolved by the absorbed water. Moreover, due to high self-extinguishing properties, the paper is not easy to burn even when exposed to flame, so that the paper is very suitable as a heat insulating material for use in buildings. Additionally, even if the paper should burn, no toxic gases are produced since only cellulose fiber burns.

In the above embodiment, the air duct in an expandable and contractible spiral duct. However, the air duct of the invention may be a usual duct such as a round duct, a rectangular duct or the like.

Furthermore, in the present invention, in order to enhance the durability or making the paper resistance to scratching, an air permeable sheet may be stuck to the surface of the paper which is not held in contact with the tubular member of the air duct to reinforce it. In consideration of the flameproof property, it is preferable that the air permeable sheet be a flameproof sheet such as a glass cloth, a carbon fiber cloth, a ceramic fiber cloth or the like. Furthermore, in order to avoid the reduction of the moisture absorbing and desorbing property, it is necessary to adjust the amount of adhesive, or to consider partial application of the adhesive.

Furthermore, the paper of the invention may be modified so as to have a corrugated structure. The corrugated structure may be a known structure such as a single faced corrugated board structure, a double faced corrugated board structure, a double wall corrugated board structure, a triple wall corrugated board structure or the like, and can be attained using a conventional corrugating machine.

With the corrugated structure, air layers are trapped between the duct papers, and hence the heat insulating property is further enhanced, thereby improving the prevention of condensation water from dripping. Furthermore, the mechanical strength, the moisture absorbing and desorbing property as well as the critical value for the condensation water dripping are enhanced.

Even when the corrugated structure is used, the air permeable sheet may be stuck to the surface of the paper. Similarly, in consideration of the flameproof property, it is preferable that the sheet be a flameproof sheet such as a glass cloth, a carbon fiber cloth, a ceramic fiber cloth or the like.

Figures 9, 10, 11, 12:
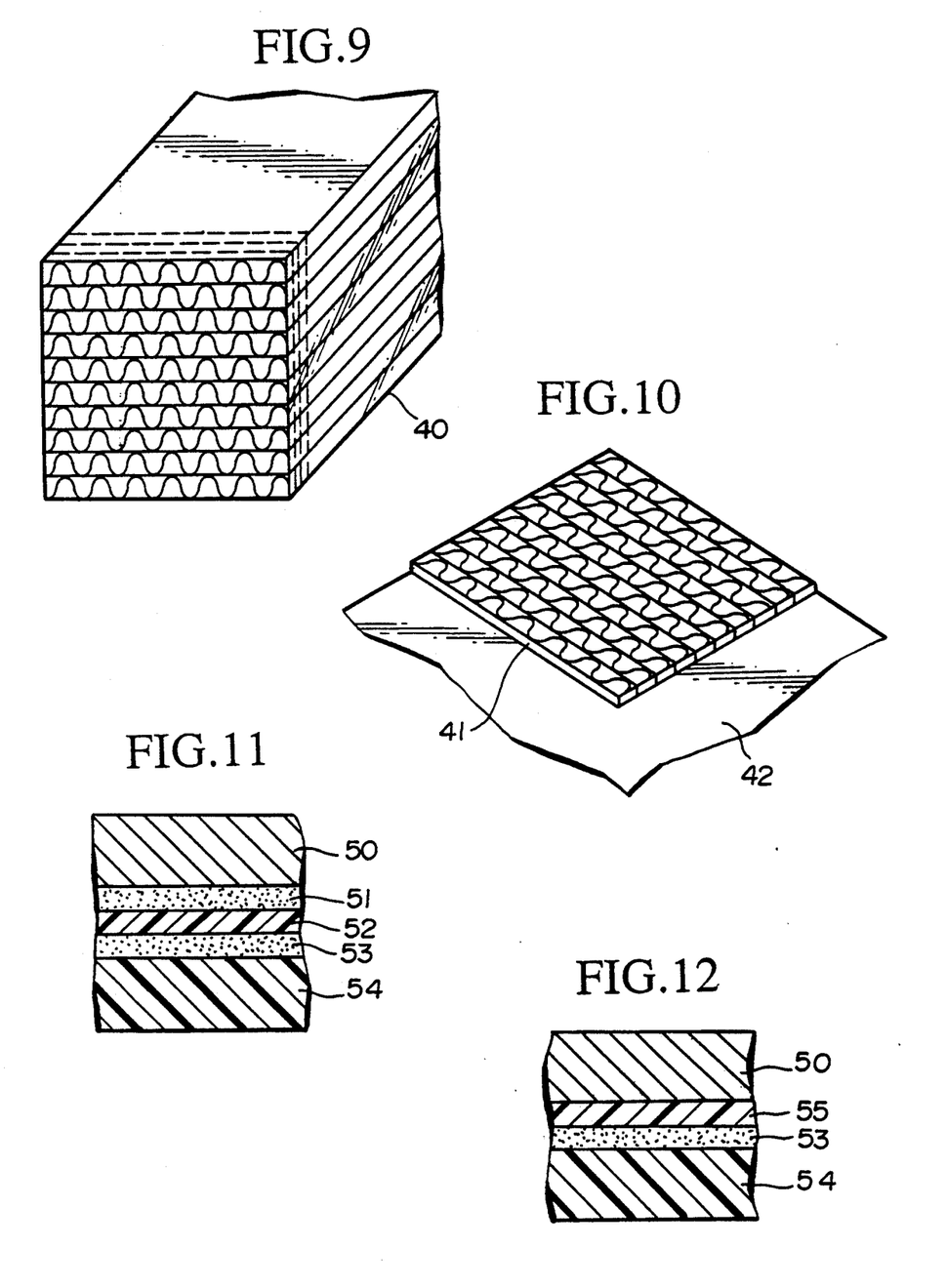
FIG. 9 is a perspective view of a paper material of a multilayer corrugated structure.
FIG. 10 is a perspective view of a paper formed by slicing the paper material of FIG. 10 into sheets.
FIG. 11 is a cross-sectional view of a modified paper which includes an adhesive layer formed on the rear face thereof.
FIG. 12 is a cross-sectional view of another modified paper which includes a modified adhesive layer on the rear face thereof.

Furthermore, as shown in FIG. 9, the paper for an air duct may be first formed into a multi-layered corrugated structure 20, and then sliced into thin sheets of a thickness of several millimeters to several tens of millimeters. Subsequently, the thin sheet 41 is laminated to a foil 42 of a metal such as aluminum. As necessary, an air permeable sheet may be provided on the surface of the paper which does not contact the air duct. The paper is wound on the duct member with the metal foil 42 being held in contact with the duct tubular member.

With the above construction, various advantages such as the increase of heat insulating effect due to the provision of the air layer, the increase of water absorption, and the moisture absorbing and desorbing effect due to the increase of surface area, reduction of weight, the improvement of workability or the like can be expected.

Furthermore, in the paper of the invention, the rear face thereof may be subjected to tackifying treatment in order to further improve the workability of the resulting air duct.

For tackifying, a known pressure-sensitive adhesive, or as necessary, a pressure-sensitive adhesive having flame retardancy, is coated on the rear face of the paper, and a sheet for separating is stuck thereto. If the pressure-sensitive adhesive is coated directly on the rear face of the paper, the adhesive is caused to penetrate into the paper, so that the stickiness thereof may be deteriorated when the paper is secured to the metal sheet. Therefore, as shown in FIG. 11, it is preferable that after the synthetic resin film or metal foil 52 is bonded to the rear face of the paper 50 through an adhesive 51, a pressure sensitive adhesive 53 is applied to the surface, and a sheet 54 for separating is secured thereto. Furthermore, it is also preferable that after a coating layer 55 of molten resin such as polyethylene or polypropylene is formed on the rear face of the paper by means of extrusion, the pressure-sensitive adhesive 53 may be applied to the surface of the coating 55, and the sheet 54 for separating is stuck thereto.

With the tackifying treatment as shown in FIG. 11 or in FIG. 12, the paper strength is improved, and it becomes easy to apply the pressure-sensitive adhesive. Furthermore, inasmuch as the synthetic resin film or metal foil layer, or the coating layer exists between the paper and the duct tubular member, the interposed layer serves as a barrier to prevent the water absorbed into the paper from contacting the duct tubular member, so that the corrosion of the duct can be prevented. For securing the paper thus tackified to the duct member, the paper is cut into a desired size, and the sheet for separating is peeled off. Then, the remaining sheet is secured to the outer periphery of the duct member. Furthermore, if the tackified paper is sliced and wound on a roll, it may be easier to secure the paper on the outer periphery of the duct member.

The present invention will now be explained in more detail with reference to the following examples, in which the weight denotes dry based weight, and the yields are converted into persentages.

EXAMPLE 1

10 parts by weight of a softwood bleached kraft pulp and 10 parts by weight of a hardwood bleached kraft pulp were mixed in 500 parts by weight of water, and were subjected to beating so as to have a freeness of 400 ml C.S.F. Then, 70 parts by weight of aluminum hydroxide (produced by Nippon Light Metal under the trade name "B-153"), 10 parts by weight of antibacterial inorganic powder (manufactured by Shinagawa Nenryo under the trade name "Antibacterial zeomic"), 1 part by weight of cationic starch (manufactured by Nippon Shokuhin Kakou under the trade name "Neotac L-1"), 1 part by weight of wet strength increasing agent (manufactured by Dick-Hercules under the trade name "Epinox P-130"), 0.5 part by weight of sizing agent (manufactured by Arakawa Kagaku under the trade name "Sizepine K-903"), and 0.05 part by weight of fixing agent (manufactured by Kurita Water Industry under the trade name "Hiholder 351" were added, and a base paper of 130 g/m$^2$ was produced using a conventional Fourdrinier machine.

A coating color which contained 95 parts by weight of aluminum hydroxide ("B-153"), 3 parts by weight of vinylidene chloride emulsion (manufactured by Asahi Chemical under the trade name of "Saran X-106"), 2 parts by weight of polyvinyl alcohol (manufactured by Kuraray under the trade name of "PVA 205"), and 0.3 parts by weight of mildewproofing powder (manufactured by Takeda Chemical Industry under the trade name of "Coat-Side 55") was coated on both the faces of the base paper in a total amount of 50 g/m$^2$ to provide an air duct paper of a basis weight of 180 g/m$^2$. Tables 1-1 and 1-3 depict the various properties of the obtained paper.

Furthermore, using 5 g/m$^2$ of polyurethane adhesive, the above paper was laminated to an aluminum foil of 120 micrometers thick using a dry lamination method. Then, as to the obtained paper, the flameproofing property and the fire retardancy were evaluated based on JIS A 1322 and JIS A 1321, respectively.

Moreover, the above aluminum laminated paper was shaped into a spiral flexible duct, and the evaluation of formability as well as a condensation test were conducted. The evaluation of the formability was carried out using a machine for producing a flexible spiral duct as shown in FIG. 4, and forming the aluminum laminated paper into a duct having a diameter of 160 mm, a distance between the corrugated ribs of 7 mm, and a height of the ridges of the ribs of 3 mm. The condensation test was carried out in an air conditioned room where the temperature and moisture content of the air varied from 22° to 30° C. and from 50 to 70%, respectively, while cooled air of 14° C. flowed through the duct. The condensation on the surface of the duct was observed for a period of 3 hours at maximum. The results are set forth in Tables 1-1 and 1-3.

EXAMPLE 2

The same constituents as in Example 1 were used to produce a base paper of a basis weight of 40 g/m². Then, without coating, the base paper thus prepared was used to produce an air duct. The various properties of the paper were measured in a manner similar to Example 1. The results are set forth in Tables 1-1 and 1-3.

EXAMPLE 3

The same constituents as in Example 1 except that the amount of aluminum hydroxide was changed to 25 parts by weight, and 45 parts by weight of silica gel (produced by Fuji Davison) was further added, were used to produce a base paper, and as a flameproof agent, 10 g/m² of guanidine sulfaminate (produced by Chisso Co.) was impregnated in the base paper to produce a flameproof agent impregnated base paper.

Then, the same coating color as in Example 1 was coated in the same amount to both faces of the above base paper to obtain an air duct paper of a basis weight of 180 g/m². Various properties were measured in a manner similar to Example 1 to evaluate various performances. The results are set forth in Tables 1-1 and 1-3.

EXAMPLE 4

The same materials as in Example 1 were used except that the total amount of softwood bleached kraft pulp and hardwood bleached kraft pulp was 40 parts by weight, aluminum hydroxide was 50 parts by weight, and no antibacterial agent was added. As was the case with Example 3, the flameproof agent was impregnated in the paper to obtain a flameproof agent impregnated base paper of a basis weight of 245 g/m².

Then, the same coating color as in Example 1 was coated in the same amount to both faces of the above base paper to obtain an air duct paper of a basis weight of 295 g/m². Various properties were measured in a manner similar to Example 1 to evaluate various performances. The results are set forth in Tables 1-1 and 1-4.

EXAMPLE 5

The same constituents as in Example 1 were used to produce a duct paper of a basis weight of 5000 g/m². Without applying any coating, the properties of the resulting base paper were measured. Subsequently, the paper was cut into an appropriate size, and was secured to a rectangular duct of FIG. 1 (500 mm height × 400 mm width) which was formed of a steel plate 1 mm thick using a lathing net for use in construction. Then, the various properties were evaluated, and the results are also set forth in Tables 1-2 and 1-4.

COMPARATIVE EXAMPLE 1

The same constituents as in Example 1 were used to produce a base paper of a basis weight of 36 g/m². Without applying any coating, the properties of the resulting base paper were measured. Then, the various properties were evaluated, and the results are set forth in Table 2-1.

COMPARATIVE EXAMPLE 2

The same constituents as in Example 1 were used except that the amount of aluminum hydroxide was changed to 80 parts by weight, and no antibacterial inorganic powder was added, and a base paper of a basis weight of 510 g/m² was produced. Without applying any coating to the paper, its various physical properties were measured to evaluate various characteristics. The results are also set forth in Table 2-1.

COMPARATIVE EXAMPLE 3

As a comparative example, a flexible spiral duct formed of an aluminum sheet which had a thickness of 120 micrometers was prepared, and its performance was evaluated in a manner similar to Example 1. The results are set forth in Table 2-2.

COMPARATIVE EXAMPLE 4

There was prepared a rectangular duct which was the same as that used in Example 5, and its performance was evaluated in the same manner as in Example 1. The results are shown in Table 2-2.

As will be seen from Tables 1-1 to 1-4 and 2-1 to 2-2, all of the papers in Examples 1 to 4 exhibit excellent results in the condensation test as well as in formability. On the other hand, in the paper of Comparative Example 1 which had the basis weight of less than 40 g/m², the critical value for condensation dripping did not reach 45 g/m², so that the results of the condensation test was unsatisfactory. Furthermore, in the paper of Comparative Example 2 which had a basis weight exceeding 500 g/m², the paper had poor formability. Hence, it was impossible to form it into a flexible spiral duct, and the condensation test could not be carried out. Furthermore, in the duct of Example 5, condensation was effectively prevented. However, in the ducts of Comparative Examples 3 and 4, the dripping of condensation occurred naturally, and the results of the condensation tests were highly negative.

TABLE 1-1

|  | Example 1 | Example 2 | Example 3 |
| --- | --- | --- | --- |
| Base paper |  |  |  |
| Pulp used (parts by weight) | 20 | 20 | 20 |
| Inorganic powder (parts by weight) |  |  |  |
| Al(OH)$_3$ | 70 | 70 | 25 |
| Antibacterial powder | 10 | 10 | 10 |
| Silica gel | — | — | 45 |
| Impregnated amount of flameproof agent (g/m²) | — | — | 10 |
| Basis weight of base paper (g/m²) | 130 | 40 | 130 |
| Coating construction |  |  |  |
| Inorganic powder (parts by weight) Al(OH)$_3$ | 95 | — | 95 |
| Binder (parts by weight) | 5 | — | 5 |
| Coated amount (g/m²) | 50 | — | 50 |

TABLE 1-2

|  | Example 4 | Example 5 |
| --- | --- | --- |
| Base paper |  |  |
| Pulp used (parts by weight) | 40 | 20 |
| Inorganic powder (parts by weight) |  |  |
| Al(OH)$_3$ | 50 | 70 |
| Antibacterial powder | — | 10 |
| Silica gel | — | — |
| Impregnated amount of flameproof agent (g/m²) | 10 | — |
| Basis weight of | 245 | 5000 |

TABLE 1-2-continued

|  | Example 4 | Example 5 |
| --- | --- | --- |
| base paper ($g/m^2$) |  |  |
| Coating construction |  |  |
| Inorganic powder (parts by weight) Al(OH)$_3$ | 95 | — |
| Binder (parts by weight) | 5 | — |
| Coated amount ($g/m^2$) | 50 | — |

TABLE 1-3

|  | Example 1 | Example 2 | Example 3 |
| --- | --- | --- | --- |
| Basis weight ($g/m^2$) | 180 | 40 | 180 |
| Thickness (mm) | 0.175 | 0.060 | 0.190 |
| Density ($g/cm^3$) | 1.03 | 0.65 | 0.95 |
| Wet strength (kgf/15 mm) | 0.9 | 0.5 | 0.8 |
| Critical value for water dripping | 95 | 45 | 200 |
| Flameproofing performance (JIS A 1322) | 1st grade | 2nd grade | 1st grade |
| Flame retardancy (JIS A 1321) | 1st grade | 1st grade | 1st grade |
| Formability | Excellent | Excellent | Excellent |
| Condensation test results | Excellent | Good | Excellent |

TABLE 1-4

|  | Example 4 | Example 5 |
| --- | --- | --- |
| Basis weight ($g/m^2$) | 295 | 5000 |
| Thickness (mm) | 0.286 | 500 |
| Density ($g/cm^3$) | 1.04 | 1.00 |
| Wet strength (kgf/15 mm) | 1.3 | >10 |
| Critical value for water dripping | 120 | 5000 |
| Flameproofing performance (JIS A 1322) | 1st grade | 2nd grade |
| Flame retardancy (JIS A 1321) | 1st grade | 1st grade |
| Formability | Excellent | — |
| Condensation test results | Excellent | Excellent |

TABLE 2-1

|  | Comparative Example 1 | Comparative Example 2 |
| --- | --- | --- |
| Base paper |  |  |
| Pulp used (parts by weight) | 20 | 20 |
| Inorganic powder (parts by weight) Al(OH)$_3$ | 70 | 80 |
| Basis weight of base paper ($g/m^2$) | 36 | 510 |

TABLE 2-1-continued

|  | Comparative Example 1 | Comparative Example 2 |
| --- | --- | --- |
| Evaluation of paper |  |  |
| Basis weight ($g/m^2$) | 36 | 510 |
| Thickness (mm) | 0.54 | 0.600 |
| Density ($g/cm^3$) | 0.65 | 0.85 |
| Wet strength (kgf/15 mm) | 0.4 | 1.2 |
| Critical value for water dropping | 40 | 220 |
| Flameproofing performance (JIS A 1322) | 1st grade | 1st grade |
| Flame retardancy (JIS A 1321) | 1st grade | 1st grade |
| Formability | Excellent | Bad |
| Condensation test results | Bad | — |

TABLE 2-2

|  | Comparative Example 3 | Comparative Example 4 |
| --- | --- | --- |
| Duct | Spiral duct | Rectangular duct |
| Evaluation of duct |  |  |
| Flameproofing performance (JIS A 1322) | 1st grade | 1st grade |
| Flame retardancy (JIS A 1321) | 1st grade | 1st grade |
| Formability | Excellent | — |
| Condensation test results | Bad | Bad |

What is claimed is:

1. An air duct comprising:
   a tubular member formed from a metal sheet;
   a water absorbing paper disposed around an outer periphery of said tubular member for absorbing and retaining condensation condensed on said tubular member to prevent the same from falling; and
   adhesive directly interposed between said tubular member and said paper to adhesively secure said tubular member and said paper.

2. An air duct as recited in claim 1, wherein said paper is a flameproof paper produced from a material including a papermaking pulp.

3. An air duct as recited in claim 1, wherein said paper is characterized by the following:
   a wet strength of at least 0.3 kgf/15 mm,
   a critical value for dripping of water droplets of at least 45 g/m$^2$, and
   a basis weight of 40 to 5000 g/m$^2$.

4. An air duct as recited in claim 1, wherein said metal sheet of said tubular member has a prescribed width and has a corrugated structure formed in a direction of the width, said metal sheet being spirally wound with a pair of longitudinal ends being adjacently disposed, said tubular member including spirally extending seams each provided for joining said longitudinal ends of said metal sheet together.

5. An air duct as recited in claim 1, wherein said paper has a plain paper structure.

6. An air duct as recited in claim 1, wherein said paper has a corrugated structure.

* * * * *